Patented Sept. 22, 1942

2,296,589

UNITED STATES PATENT OFFICE 2,296,589

FLUORESCENT PAINT

John A. C. Yule, Rochester, N. Y., assignor to Eastman Kodak Company, Rochester, N. Y., a corporation of New Jersey No Drawing. Application April 5, 1940, Serial No. 328,068

9 Claims. (Cl. 250—81)

This invention relates to coloring materials and particularly to fluorescent paints.

It is the primary object of this invention to provide a fluorescent paint which is stable to air and to exposure to light.

In U. S. Patents 2,008,290 and 2,108,503, Alexander Murray describes a photo-mechanical process requiring fluorescent paints. Also paints fluorescing in different hues are required in a copending application Serial No. 328,066 filed April 5, 1940, concurrently with the present application by Murray and myself. It is a specific object of the present invention to provide fluorescent paints i. e. artists' coloring materials, for these processes which paints are highly stable to both light and air. Since the processes of these patents and copending application involve the exposure of the fluorescent paints to high intensity illumination during reproduction, it is very essential that the paints have a relatively high stability to light. The advantage of having the paints also stable to exposure to air is that it eliminates the need for protective coatings or protective atmospheres and reduces the deterioration or fading of the fluorescent effect of pictures painted with these paints.

It is also an object of the invention to provide a fluorescent paint which is highly efficient, that is, to provide a paint whose fluorescent ingredient is not masked by the other pigments present. Of course, pigments which absorb the fluoro-activating light (e. g. ultra violet) and/or the fluorescent light reduce the effect of any fluorescent ingredient greatly. Certain fluorescent ingredients are more subject than others to this masking. This latter phenomenon is apparently tied up with the optical density of the material to ultra violet light. For example, when two different materials having the same fluorescent brightness en masse are made up into paints with other pigments, the one having the least ultra violet absorption becomes less efficient (less bright) than the other one.

After testing every fluorescent paint known to me, available on the market or described in the literature on paints and finding none superior to those disclosed in the above Murray patents, I began experimenting with every fluorescent material I could get to discover which ones if any were satisfactory as ingredients for paints. I have discovered that a paint containing chrysene as the major portion of its fluorescent ingredient is far superior to any prior fluorescent paints and to any others which I made up during my tests.

The preferred embodiment of my invention consists of a paint containing as its fluorescent ingredient only chrysene or chrysene plus small amounts of naphthacene to alter the hue of the fluorescent light.

The fluorescent ingredient may be combined with any desired color pigment, preferably but not necessarily a pigment having no inherent fluorescent properties, in a suitable vehicle, i. e. with a vehicle which does not react with chrysene or the pigment at ordinary temperatures. A vehicle containing a gum binder such as gum arabic, a dispersing agent and glycerine is quite satisfactory. Also oil vehicles (non-aqueous) such as linseed oil varnish or dammar varnish are satisfactory. In general, fluorescent paints may be either clear or colored, but chrysene prepared in the following manner gives a white or yellow color to the paint and hence is not suitable for clear lacquers. The invention is applicable to any coloring material including white which is not required to be transparent.

As an example of a convenient method of preparing such a paint, I have found the following to be satisfactory. The chrysene which is commercially available on the market is about 12% soluble in solvent naphtha when boiling. A decolorizing carbon is added to such a solution, the solution is boiled and the chrysene recrystallized therefrom. If a violet fluorescence is required, five parts of maleic anhydride is added to the solution for every hundred parts of chrysene and boiled for fifteen minutes. This step destroys any naphthacene which may be present.

If a green fluorescence is required, the maleic anhydride is omitted and a certain quantity of naphthacene is dissolved in the filtered solution before cooling. To give a blue-green fluorescence, 0.1% of naphthacene is required and to give a green fluorescence, 1% of naphthacene is required. In no case should the naphthacene exceed one thirtieth of the chrysene, because after the optimum is passed at about 1 to 2%, additional amounts of naphthacene weaken the fluorescence.

After the chrysene has been recrystallized either with or without naphthacene, and cooled, it is filtered off and washed, for example with methanol and dried. If desired the chrysene crystals may now be ground to form a dry fluorescent pigment to be later added to a paint. Preferably, however, I prefer to grind the chrysene in the material which is to form the vehicle for the paint.

For example, 100 parts of chrysene may be ground in a pebble mill with 200 parts of a water solution containing 10% gum arabic, 0.2% phenol, 3% glycerine, and 1.5% Darvan (a dispersing agent). Fifteen per cent more gum arabic is added after the particle size has been reduced fine enough. Other color pigments may be added to the paint to give the hue desired. It is desirable that the additional color pigments should have no fluorescence of their own or that their fluorescence should also be stable to light and air.

In this specification, per cent means per cent by weight and "parts" mean parts by volume.

Having thus described the preferred embodiments of my invention, I wish to point out that it is not limited except as defined by the following claims.

What I claim and desire to secure by Letters Patent of the United States is:

1. A fluorescent coloring material comprising as its fluorescent ingredient chrysene and naphthacene in a ratio by weight greater than 30 to 1.

2. A green-fluorescent coloring material comprising as its fluorescent ingredient 99 per cent by weight of chrysene and 1 per cent by weight of naphthacene crystallized together.

3. A blue-green fluorescent coloring material comprising as its fluorescent ingredient 99.9 per cent by weight of chrysene and 0.1 per cent by weight of naphthacene crystallized together.

4. A fluorescent paint comprising a dispersing agent, a gum binder, glycerine and fluorescent ingredient from the group consisting of pure chrysene and chrysene plus less than 3% naphthacene crystallized together.

5. A fluorescent paint comprising chrysene, a non-fluorescent pigment for giving the paint the desired color and a vehicle which does not normally react with chrysene or the pigment for binding the chrysene and pigment and for affixing the paint to surfaces to be colored.

6. A fluorescent coloring material including a vehicle for affixing the material to surfaces to be colored and a fluorescent ingredient consisting of chrysene.

7. A fluorescent coloring material including a vehicle for affixing the material to surfaces to be colored and a fluorescent ingredient, the major portion of which is chrysene.

8. A fluorescent coloring material comprising a vehicle for affixing the material to surfaces to be colored, a pigment and a fluorescent ingredient consisting of chrysene.

9. A fluorescent coloring material comprising a vehicle for affixing the material to surfaces to be colored, a pigment and a fluorescent material, the major portion of which is chrysene.

JOHN A. C. YULE.